United States Patent Office 3,033,880
Patented May 8, 1962

3,033,880
BLUE DISPERSE DYESTUFFS OF THE
ANTHRAQUINONE SERIES
Paul Buecheler, Reinach, Baselland, Switzerland, assignor
to Sandoz Ltd., Basel, Switzerland
No Drawing. Filed May 17, 1960, Ser. No. 29,565
Claims priority, application Switzerland June 1, 1959
1 Claim. (Cl. 260—377)

The object of this invention is a new compound of the formula

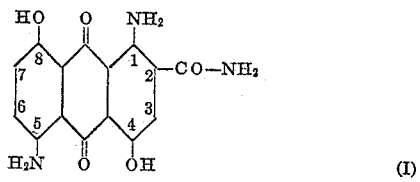

The invention relates further to a process for the production of the disclosed compound, which is an excellent blue disperse dyestuff, a process for dyeing and printing artificial hydrophobic organic fibers and fiber materials with this new dyestuff, and the fibers or fiber materials thus dyed or printed.

The new compound, 1,5-diamino-4,8-dihydroxyanthraquinone-2-(3)-carboxylic acid amide, can be obtained from the corresponding nitrile of the formula

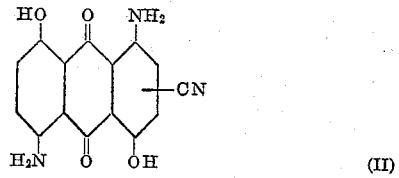

by saponification. The nitrile (II) can be produced by bromination of 1.5-diamino-4.8-dihydroxyanthraquinone and reaction of the resulting bromide with copper-1-cyanide.

1.5-diamino-4.8-dihydroxyanthraquinone can be effectively brominated in sulfuric acid solution with the aid of a halogen carrier, e.g. with the addition of boric acid in concentrated or fuming sulfuric acid or 1–26% oleum. The boric acid is dissolved at room or slightly higher temperature in the concentrated or fuming sulfuric acid, and the 1.5-diamino-4.8-dihydroxyanthraquinone stirred in. Then the necessary amount of bromine is added until the starting product disappears. The brominating temperature may range from 20° to 120° C., but is preferably between 35° and 100° C. The reaction time varies from 5 to 25 hours depending on the conditions chosen. On completion of the reaction the mass is run into water and the precipitated brominated compound is filtered with suction, washed and dried. Paraformaldehyde is another suitable halogen carrier.

1.5 - diamino-2-(3)-bromo-4.8-dihydroxyanthraquinone can be converted into 1.5-diamino-2-(3)-cyano-4.8-dihydroxyanthraquinone by reacting it at elevated temperature in an organic solvent with the requisite amount, but preferably an excess, of copper-1-cyanide. As a rule, a temperature between 180° and 220° C. is chosen. The reaction product is purified with organic solvents and aqueous hydrochloric acid, washed with water and dried.

Saponification is effected by heating with strong inorganic acids. As is common in the saponification of carboxylic acid nitriles to carboxylic acid amides, preference is given to the mineral acids sulfuric and phosphoric acid, but hydrochloric acid can be used. The strength of the sulfuric or phosphoric acid is 85–100%, while for hydrochloric acid the optimum strength is 30–35%. The temperature of saponification lies between about 60° and 120° C. Generally, the acid is employed in excess of the amount theoretically necessary for saponification of the nitrile group. Even a substantial excess of acid has no adverse effect. The excess acid acts as a solvent.

On complete saponification the reaction mixture is run into water to isolate the carboxylic acid amide; the precipitate is separated, e.g. by filtering with suction, and washed with water until of neutral reaction.

Bromination of 1.5-diamino-4.8-dihydroxyanthraquinone is apt to give rise to small amounts of 1.5-diamino-3-bromo-4.8-dihydroxyanthraquinone and, consequently, the new dyestuff sometimes contains a low proportion of isomeric 3-carboxylic acid amide.

For the production of a dyestuff preparation the moist presscake can be dried and ground in presence of surface-active agents and, if necessary, grinding assistants. Suitable surface-active agents are e.g. dispersing agents and/or wetting agents and/or thickening agents, which may be employed in presence of a moisture-retaining agent and/or an acid donor.

Examples of suitable surface-active agents having dispersing or wetting action are sodium lignin sulfonate, sodium dinaphthylmethane disulfonate, the sodium salt of the dried secondary licorice extract, sulfonated fatty acids and their esters, sulfonated oils, fatty alcohol sulfonates or sulfates, secondary alcohol sulfates, fatty acid condensation products such as sodium oleoyloxyethanesulfonate, sodium oleoyl amino- or -N- oleoyl-N-methylaminoethanesulfonate, dibutyl- or triisopropylnaphthalene-sulfonates, decyl-, dodecyl- or tetradecylbenzene-sulfonates, dinonyl- or dioctylsulfosuccinates, 2-higher-alkylbenzimidazolesulfonates, tert. dodecylthiopolyglycol-ether, octyl-, decyl-, dodecyl-, trimethylnonyl-, cetyl-, stearyl-, oleyl-, octylphenyl-, nonylphenyl-, dodecylphenyl-, dioctylphenyl-, dinonylephenylpolyglycolether, -polyglycoloxyacetic acids or -polyglycolether sulfates. Suitable thickening agents are water-soluble alginates, e.g. sodium alginate, crystal gum, gum tragacanth, modified or unmodified locust bean gums etc.

Of the suitable moisture-retaining agents, special mention may be made of glycerine and ethylene glycol. Effective acid donors are e.g. ammonium sulfate, diammonium tartrate, diammonium phosphate, acetic acid and formic acid. An addition of urea also has proved favorable.

Inorganic, preferably water-soluble, salts such as sodium sulfate or sodium chloride can be used as grinding assistants.

The moist press cake is ground preferably in a mill, e.g. a ball or roller mill, in presence of dispersing agents until the major proportion of the dyestuff particles has a size of about 0.1–10$\mu$ or, preferably, 1–3$\mu$. Having been brought to this state, the paste is dried in suitable drying equipment, e.g. a nozzle drier.

The product is a fine powder which is readily dispersible in water and is eminently suitable for dyeing and printing artificial fibers and fiber materials, e.g. filaments, yarns, woven fabrics and knitted goods. The term artificial fibers is used here to cover the partially synthetic fibers made from cellulose and the fully synthetic fibers, e.g. cellulose esters and ethers, linear polyesters from terephthalic acid and glycols, especially ethylene glycol, synthetic polyamides, e.g. polycondensation products of dicarboxylic acids such as adipic acid and diamines such as hexamethylenediamine, poly-$\omega$-lactams, especially poly-$\epsilon$-caprolactam or poly-$\omega$-capryllactam, poly-$\omega$-undecyllactam, polyurethanes or polyvinyl esters. The dyeings on secondary cellulose acetate have very good fastness to light, washing, water, perspiration, gas fumes and rubbing; those on cellulose triacetate and linear aromatic polyesters are outstandingly fast to light, washing, perspiration, sublimation and heat setting. Wool, cotton or viscose present in the dyebath is reserved.

In the examples which follow the parts and percentages are by weight and the temperatures in degrees centigrade.

*Examples 1*

7 parts of 1.5-diamino-2-(3)-cyano-4.8-dihydroxyanthraquinone and 90 parts of 96% sulfuric acid are stirred for 24 hours at 80°. The reaction mass is run into 500 parts of cold water and the precipitate formed is filtered with suction, washed with water and dried. It is 1.5-diamino-4.8-dihydroxyanthraquinone-2-(3)-carboxylic acid amide and dissolves in hot chlorobenzene to give greenish blue solutions.

1 part of this 1.5-diamino-4.8-dihydroxyanthraquinone-2-(3)-carboxylic acid amide, 1 part of the sodium salt of dinaphthylmethane disulfonic acid and 8 parts of water are ground until a fine dispersion is obtained, which is run into a solution of 3000 parts of water, 2 parts of sulfonated castor oil and 2 parts of 2-hydroxy-1.1'-diphenyl. In this bath 100 parts of polyterephthalic acid ethylene glycol ester fiber are entered at 60° and the temperature raised to the boil in 20 minutes. The goods are dyed for 1 hour at 100°, removed, rinsed with water, treated for 15 minutes at 70° in a bath of 3000 parts of water and 1.5 parts of an alkylphenylpolyglycol ether, then removed, rinsed and dried. The polyester fiber is dyed in a greenish blue shade of excellent fastness to light, washing, perspiration, pleating and heat setting. Wool, cotton and viscose in blended fabrics are well reserved.

The intermediate products, for which no claims are made, can be produced as follows:

4 parts of boric acid are dissolved in 130 parts of oleum containing 4% sulfur trioxide, and 13 parts of 1.5-diamino-4.8-dihydroxyanthraquinone are stirred into the solution. The mass is heated to 100° with stirring. In 6 hours at 100° 9 parts of bromine are added dropwise, then the reaction mixture is stirred for 2 hours at 120° C., cooled to 75° and run into 1500 parts of cold water. The precipitate formed is filtered off, washed with water and dried. It is a dark blue powder containing 24.2% bromine and consists for the greater part of 1.5-diamino-4.8-dihydroxy-2-(3)-bromoanthraquinone. It dissolves in concentrated sulfuric acid with a yellowish green coloration which changes to green-gray on the addition of paraformaldehyde. In cold chlorobenzene it gives reddish blue solutions.

72 parts of the bromination product thus obtained are mixed with 20 parts of copper-1-cyanide, 400 parts of nitrobenzene and 20 parts of pyridine for 20 hours at 200–205°. 160 parts of methanol are added to the reaction mixture at 85°, then the mixture is filtered and washed with methanol until the nitrobenzene is eliminated. The precipitate is washed with aqueous methanol, stirred with 2000 parts of 5% aqueous hydrochloric acid for 20 hours at 70°, filtered, washed neutral with water and dried.

Having thus described the invention what I claim is:

1.5 - diamino - 4.8 - dihydroxyanthraquinone - 2 - (3)- carboxylic acid amide.

References Cited in the file of this patent
UNITED STATES PATENTS

| | | |
|---|---|---|
| 1,270,348 | Walther | June 25, 1918 |
| 1,678,611 | Wagner et al. | July 24, 1928 |
| 2,195,462 | Krause et al. | Apr. 2, 1940 |
| 2,819,288 | Grossmann | Jan. 7, 1958 |
| 2,833,789 | Giambalvo et al. | May 6, 1958 |